US012567725B2

(12) United States Patent
Updike

(10) Patent No.: US 12,567,725 B2
(45) Date of Patent: Mar. 3, 2026

(54) SYSTEM FOR SECURING A WIRE HARNESS WITH A TIE STRAP

(71) Applicant: GM GLOBAL TECHNOLOGY OPERATIONS LLC, Detroit, MI (US)

(72) Inventor: Kevin Updike, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 232 days.

(21) Appl. No.: 18/382,843

(22) Filed: Oct. 23, 2023

(65) Prior Publication Data

US 2025/0132545 A1 Apr. 24, 2025

(51) Int. Cl.
*H02G 3/04* (2006.01)
*F16L 3/233* (2006.01)

(52) U.S. Cl.
CPC .......... *H02G 3/0406* (2013.01); *F16L 3/2332* (2013.01)

(58) Field of Classification Search
None
See application file for complete search history.

(56) References Cited

U.S. PATENT DOCUMENTS

| | | | | |
|---|---|---|---|---|
| 3,633,628 | A | * | 1/1972 | Duquette ............. H02G 3/0608 |
| | | | | 138/116 |
| 5,401,905 | A | * | 3/1995 | Lesser ...................... H02G 3/26 |
| | | | | 174/101 |

| | | | | |
|---|---|---|---|---|
| 6,294,736 | B1 | * | 9/2001 | Takeda ..................... H02G 3/30 |
| | | | | 174/99 R |
| 6,444,912 | B1 | * | 9/2002 | Grossman ........... B60R 16/0215 |
| | | | | 174/99 R |
| 10,170,897 | B2 | * | 1/2019 | Nomura .............. B60R 16/0215 |
| 2003/0006057 | A1 | * | 1/2003 | Ito ........................ B60R 16/0215 |
| | | | | 174/68.3 |
| 2007/0187144 | A1 | * | 8/2007 | Kato .................. B60R 16/0215 |
| | | | | 174/72 A |
| 2011/0147078 | A1 | * | 6/2011 | Satou .................... B60R 16/027 |
| | | | | 174/72 A |
| 2013/0118777 | A1 | * | 5/2013 | Yamaguchi ......... B60R 16/0215 |
| | | | | 174/135 |
| 2017/0214228 | A1 | * | 7/2017 | Kawashima ......... H02G 3/0456 |
| 2019/0140431 | A1 | * | 5/2019 | Namiki ................. H01B 17/58 |
| 2024/0313469 | A1 | * | 9/2024 | Hikota .............. H01R 13/5812 |

FOREIGN PATENT DOCUMENTS

| | | | | |
|---|---|---|---|---|
| JP | | H0666233 U | * | 9/1994 |
| JP | | 2573177 Y2 | * | 5/1998 |

* cited by examiner

*Primary Examiner* — Krystal Robinson

(57) ABSTRACT

A system for securing a wire harness with a tie strap. The system includes: a body defining a channel configured to receive the wire harness; and a cradle adjacent to the channel, the cradle configured to hold a head of the tie strap, the cradle defining an opening for the tie strap to pass through. The wire harness is secured within the channel by the tie strap extending out of the cradle through the opening, under the body, across the channel, and into cooperation with the head seated in the cradle.

20 Claims, 3 Drawing Sheets

SYSTEM FOR SECURING A WIRE HARNESS WITH A TIE STRAP

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a system for securing a wire harness with a tie strap.

A wire harness is an assembly of electrical cables or wires that transmit signals or electrical power. The cables may be bound together by a durable material, such as, rubber, vinyl, electrical tape, etc. By binding the wires and cables into a cable harness, the wires and cables can be better secured against vibrations, abrasions, and moisture, for example. Because the installer has only one harness to install (as opposed to multiple loose wires), installation time is decreased and the process can be easily standardized.

SUMMARY

The present disclosure includes, in various features, a system for securing a wire harness with a tie strap. The system includes: a body defining a channel configured to receive the wire harness; and a cradle adjacent to the channel, the cradle configured to hold a head of the tie strap, the cradle defining an opening for the tie strap to pass through. The wire harness is secured within the channel by the tie strap extending out of the cradle through the opening, under the body, across the channel, and into cooperation with the head seated in the cradle.

In further features, the cradle is outside of the channel.

In further features, the body includes a base and sidewalls defining the channel.

In further features, at least one of the sidewalls includes a notch aligned with the cradle and configured to accommodate the tie strap within the notch.

In further features, the cradle is integral with one of the sidewalls.

In further features, the cradle includes a clamp configured to attach the cradle to one of the sidewalls.

In further features, the cradle includes a retention tab at the opening configured to retain the tie strap within the opening and retain the head within the cradle.

In further features, the cradle defines a recess configured to accommodate an end of the tie strap protruding outward from the head.

In further features, a ledge is within the cradle, the ledge configured to support the head of the tie strap.

In further features, the cradle is configured to hold the head at only a single orientation.

The present disclosure further provides for, in various features, a system for securing a wire harness. The system includes: a tie strap extending from a head, the head configured to lock onto the tie strap; a support member configured to hold the wire harness; and a cradle adjacent to the support member, the cradle configured to hold the head of the tie strap, the cradle defining an opening for the tie strap to pass through. The tie strap is configured to secure the wire harness against the support member by extending around the support member and into cooperation with the head.

In further features, the cradle is outside of a channel defined by the support member.

In further features, the cradle is integrally molded with the support member.

In further features, the cradle is clipped onto the support member.

In further features, the cradle includes a metallic clip configured to clip onto a surface of the support member.

In further features, the cradle includes a retention tab at the opening configured to retain the tie strap within the opening and retain the head within the cradle.

In further features, a ledge is within the cradle, the ledge configured to support the head of the tie strap.

In further features, the cradle is configured to hold the head, and receive the head within the cradle, at only a single orientation.

The present disclosure further includes, in various features, a system for securing a wire harness. The system includes: a tie strap extending from a head, the head configured to receive an end of the tie strap and lock onto the tie strap; a support member including a channel defined by a base, a first sidewall, and a second sidewall; a cradle outside of the channel at one of the first sidewall and the second sidewall, the cradle configured to hold the head of the tie strap at only a single orientation, the cradle defining an opening at a bottom of the cradle for the tie strap to pass through; and a retention tab at the opening of the cradle configured to retain the tie strap within the opening and retain the head within the cradle. The wire harness is secured within the channel by the tie strap extending out of the cradle through the opening, under the base, across the channel, and into cooperation with the head seated in the cradle.

In further features, the cradle includes a clamp configured to attach the cradle to one of the first sidewall and the second sidewall.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figures 1, 2:
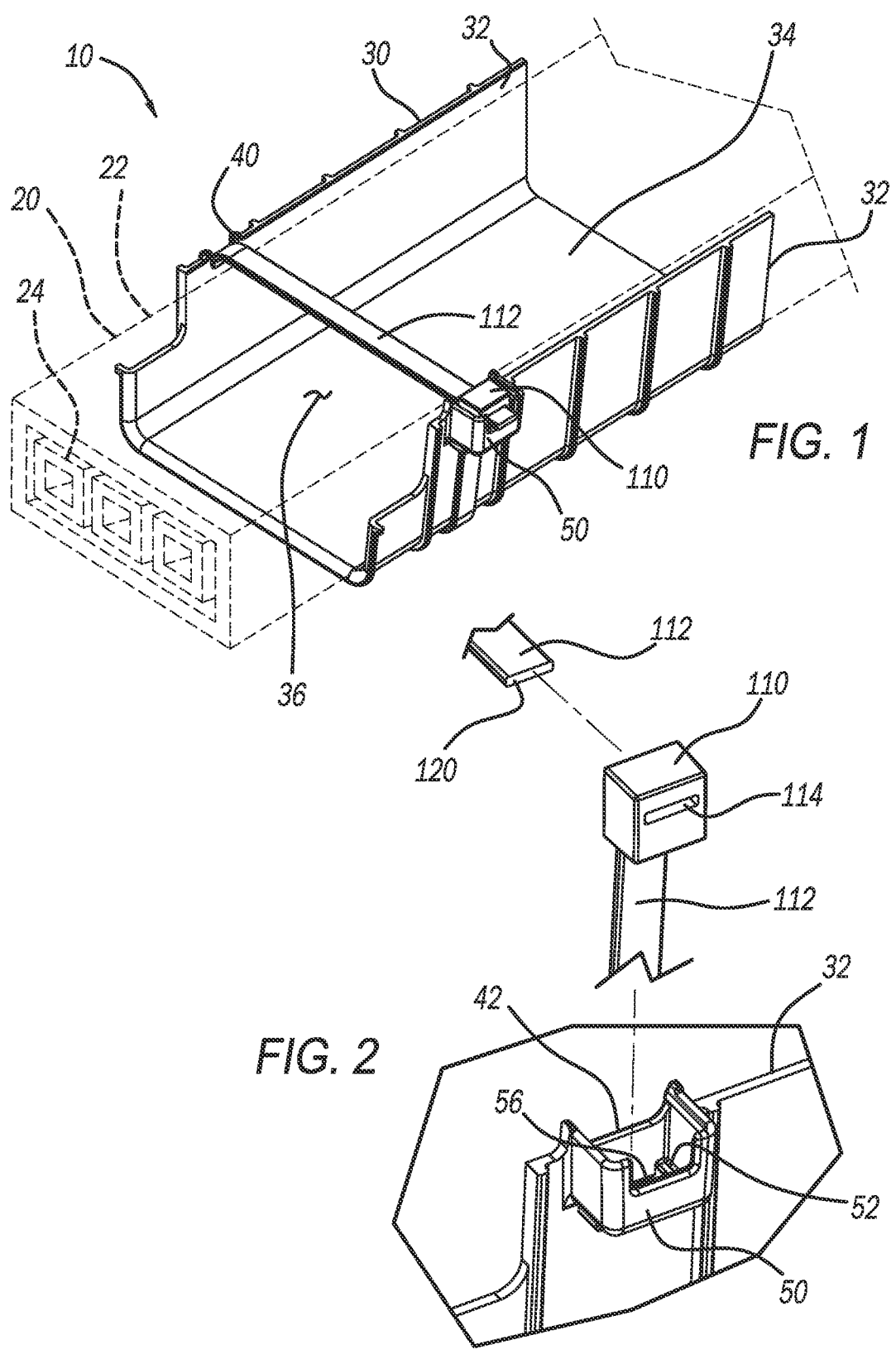
FIG. 1 is a perspective view of a system for securing a wire harness in accordance with the present disclosure.
FIG. 2 is a perspective view of a cradle of the system of FIG. 1 with a head of a tie strap raised upward, and out of the cradle.

FIG. 1 illustrates an exemplary system 10 for securing a wire harness. FIG. 1 illustrates an exemplary wire harness 20, which includes a plurality of cables or wires 22. The wire harness 20 further includes a connector 24. The wire harness 20 may be configured for use in any suitable automotive application, and may be configured for use in any suitable non-automotive applications as well.

The system 10 includes a body 30 configured to receive, hold, or otherwise support the wire harness 20. The body 30 may thus be configured as a support member for the wire harness 20. In the example of FIG. 1, the body 30 includes a pair of sidewalls 32 spaced apart on opposite sides of a base 34. The sidewalls 32 and the base 34 generally define a channel 36 configured to receive the wire harness 20 therein.

The system 10 further includes a cradle 50, which is configured to hold a head 110 of a tie strap 112. The cradle 50 is outside of, and adjacent to, the channel 36. In the example of FIG. 1, the cradle 50 is integral with one of the sidewalls 32 on an outside of the sidewall 32. The cradle 50 may be integrally molded with the sidewall 32. The sidewall 32 opposite to the cradle 50 (on an opposite side of the channel 36) includes a first notch 40, which is configured to receive the tie strap 112.

The sidewall 32 at the cradle 50 defines a second notch 42 (FIG. 2), which is opposite to the first notch 40. The second notch 42 is also configured to receive the tie strap 112, as explained herein.

Figure 3:
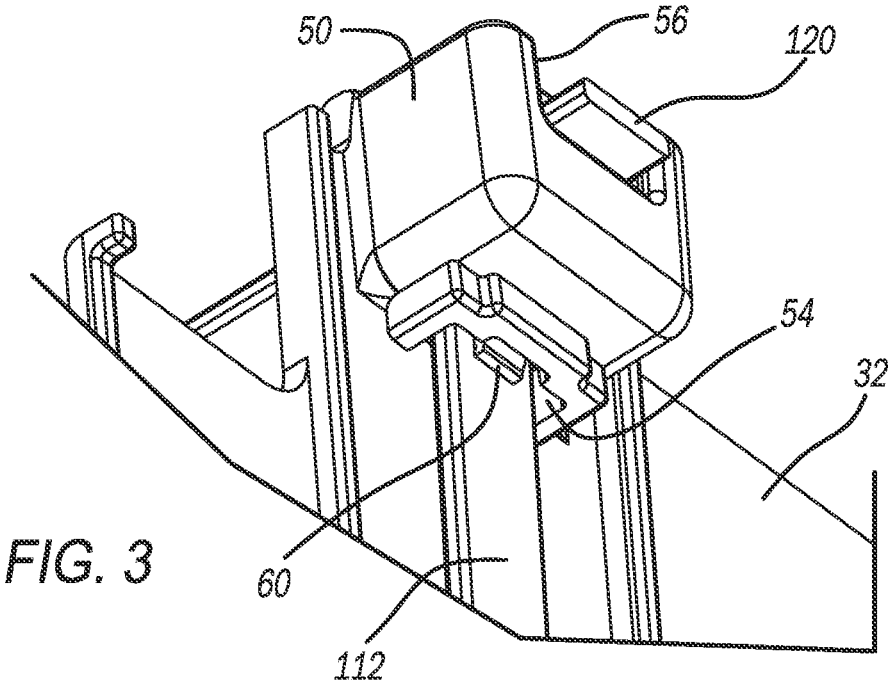
FIG. 3 is another perspective view of the cradle with the head of the tie strap seated within the cradle, and the tie strap extending out from within the cradle.
Figure 4:
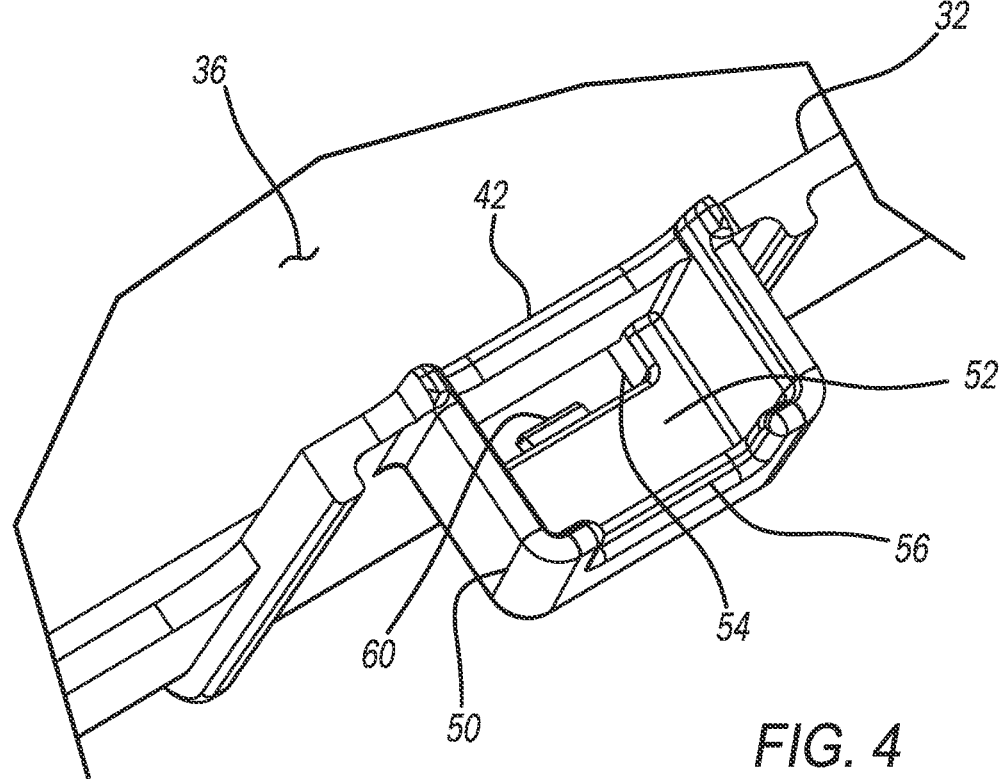
FIG. 4 is a perspective view of the cradle without the head and the tie strap.

With continued reference to FIG. 1, and additional reference to FIGS. 2-4, a ledge 52 is included within the cradle 50. The ledge 52 is configured to support the head 110. The ledge 52, as well as an overall interior size and shape of the cradle 50, is configured to support the head 110 in only a single orientation in order to properly orient the head 110 and the tie strap 112, as explained in detail herein.

The cradle 50 defines an opening 54 at a bottom of the cradle 50, as illustrated in FIGS. 3 and 4 in particular. The opening 54 is configured to receive the tie strap 112 extending from the head 110. At the opening 54, the cradle 50 includes a retention tab 60, which is configured to contact the tie strap 112 in order to retain the tie strap 112 within the opening 54, and thereby retain the head 110 within the cradle 50. For example, the retention tab 60 may be a flexible member biased towards the sidewall 32. When the tie strap 112 is inserted into the cradle 50 and through the opening 54, the retention tab 60 will flex outward to accommodate the tie strap 112 as the tie strap 112 is threaded through the opening 54. With the tie strap 112 seated within the opening 54, the retention tab 60 presses against the tie strap 112 to restrict movement of the tie strap 112. The cradle 50 further defines a recess 56, which is on an outside surface of the cradle 50 opposite to the second notch 42.

The tie strap 112 extends from the head 110, which defines an opening, such as a slot 114. The slot 114 is configured to receive the tie strap 112. A distal end 120 of the tie strap 112 is threaded through the slot 114. Within the head 110 is any suitable retention member, such as a retention tab, configured to cooperate with the tie strap 112 to lock, or otherwise retain, the tie strap 112 within the head 110 after the tie strap 112 is threaded through the slot 114. The head 110 and the tie strap 112 may that of any suitable retention tie known in the art.

Use of the tie strap 112 to secure the wire harness 20 to the body 30 will now be described. The tie strap 112 is first threaded through the opening 54 of the cradle 50, and pulled through the opening 54 until the head 110 is seated within the cradle 50 against the ledge 52. Thus, with the head 110 seated in the cradle 50, the tie strap 112 will hang downward from the cradle 50 until the tie strap 112 is wrapped around the body 30. The cradle 50 may be sized and shaped to receive the head 110 in only a single orientation. For example, the cradle 50 may be sized and shaped to only receive the head 110 in an orientation in which an entry or inlet side of the slot 114 faces the channel 36, and an exit or outlet side of the slot 114 faces the recess 56. This positioning of the head 110 within the cradle 50 may be performed by, for example, a manufacturer or supplier of the system 10. The system 10, with the head 110 seated in the cradle 50 and the tie strap 112 hanging therefrom, may be provided to an original equipment manufacturer (OEM), or other assembler, for use of the system 10 to secure the wire harness 20 to the body 30.

With the wire harness 20 seated in the channel 36, the tie strap 112 is pulled around an undersurface of the base 34, pulled upwards against an outer surface of the sidewall 32 defining the first notch 40, seated within the first notch 40, pulled across the channel 36 and through the second notch 42, and then threaded through the slot 114 (or any other opening configured to receive and retain the tie strap 112) of the head 110. The recess 56 of the cradle 50 is configured to accommodate any portion of the tie strap 112 extending out from within the head 110.

The tie strap 112 is pulled tightly across the channel 36 such that the tie strap 112 extends across the channel 36 generally perpendicular to a length of the channel 36. The tie strap 112 thus generally extends around the channel 36, and is not within the channel 36, in order to not reduce the volume of the channel 36 or otherwise obstruct the channel 36. By extending around the channel 36, the tie strap 112 maximizes the area available for the wire harness 20. Furthermore, the tie strap 112 does not protrude any significant distance from the body 30, and therefore does not protrude into the environment about the system 10 at an installation site of the system 10.

Figures 5, 6:
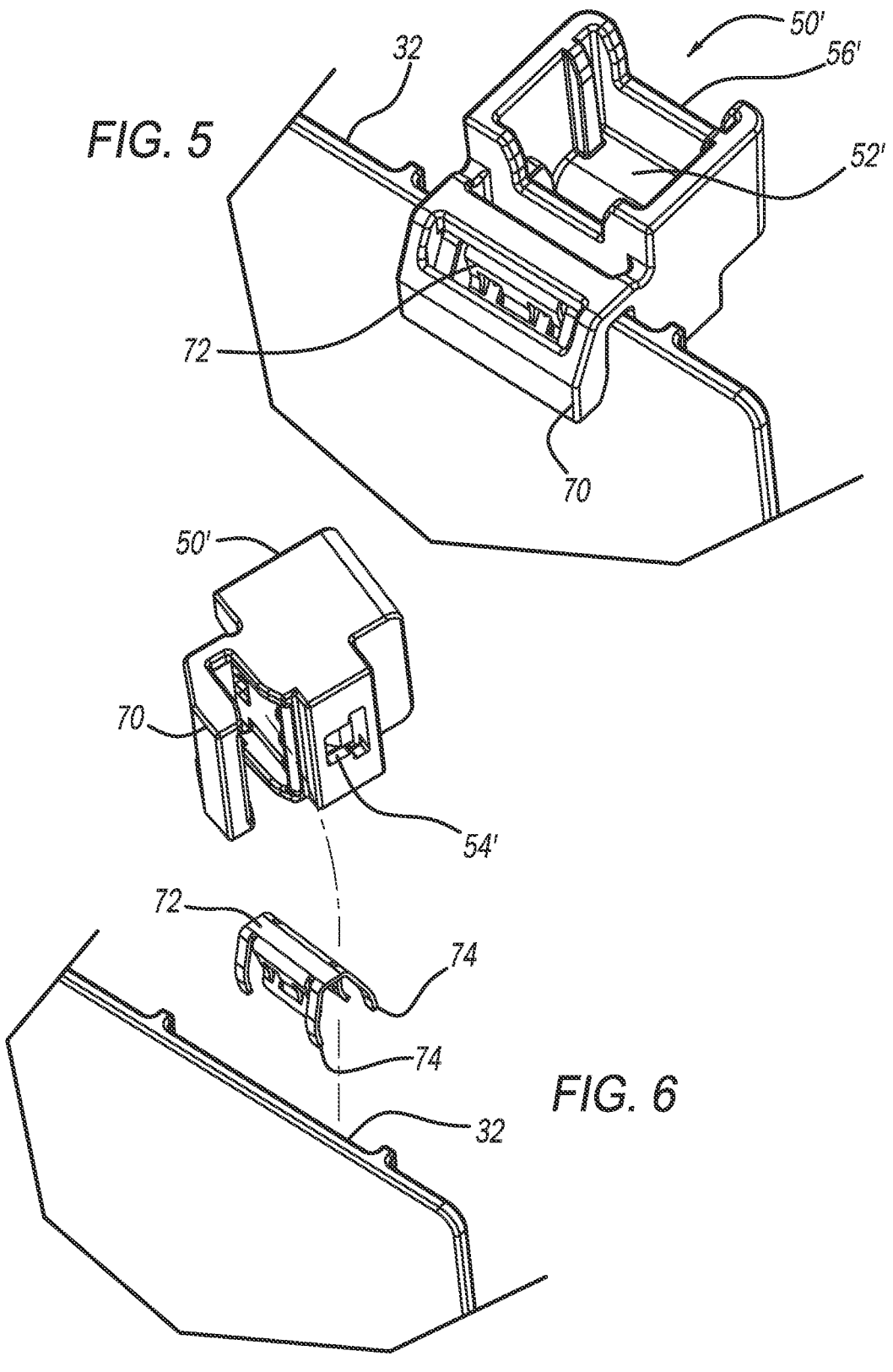
FIG. 5 is a perspective view of an additional cradle in accordance with the present disclosure configured to hold the head of the tie strap.
FIG. 6 is another perspective view of the cradle of FIG. 5 with a clamp separated from the cradle.

FIGS. 5 and 6 illustrate an additional configuration of the cradle 50 at reference numeral 50'. Features of the cradle 50' that are similar to, or the same as, the cradle 50 are identified in FIGS. 5 and 6 with the same reference numerals used in FIGS. 1-4, but supplemented with the prime (') designation. Unlike the cradle 50, the cradle 50' is a separate component, which is attached to one of the sidewalls 32. For example, the cradle 50' may be molded independent of the body 30, and then clipped onto one of the sidewalls 32. The cradle 50' includes a clip 70, configured to extend over the sidewall 32 to sit against an inner surface of the sidewall 32 and hang the rest of the cradle 50' outside of the channel 36 opposite to an outer surface of the sidewall 32. The clip 70 includes any suitable retention device, such as a clamp 72. The clamp 72 is flexible and may include two or more fingers 74 configured to engage opposite sides of the sidewall 32. For example, the clamp 72 may be a metallic clamp with metallic fingers 74 biased towards each other. When the clip 70 is seated over the sidewall 32, the fingers 74 are spread apart to receive the sidewall 32 therebetween. Once seated on the sidewall 32, the fingers 74 apply pressure to opposite sides of the sidewall 32 to restrict movement of the clip 70 along the sidewall 32, and prevent the cradle 50 from being detached from the sidewall 32.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A system for securing a wire harness with a tie strap, the system comprising:
    a body defining a channel configured to receive the wire harness; and
    a cradle adjacent to the channel, the cradle configured to hold a head of the tie strap, the cradle defining an opening for the tie strap to pass through; and
    a ledge within the cradle, the ledge configured to support the head of the tie strap,
    wherein the wire harness is secured within the channel by the tie strap extending out of the cradle through the opening, under the body, across the channel, and into cooperation with the head seated in the cradle.

2. The system of claim 1, wherein the cradle is outside of the channel.

3. The system of claim 1, wherein the body includes a base and sidewalls defining the channel.

4. The system of claim 3, wherein at least one of the sidewalls includes a notch aligned with the cradle and configured to accommodate the tie strap within the notch.

5. The system of claim 3, wherein the cradle is integral with one of the sidewalls.

6. The system of claim 3, wherein the cradle includes a clamp configured to attach the cradle to one of the sidewalls.

7. The system of claim 1, wherein the cradle includes a retention tab at the opening configured to retain the tie strap within the opening and retain the head within the cradle.

8. The system of claim 1, wherein the cradle defines a recess configured to accommodate an end of the tie strap protruding outward from the head.

9. The system of claim 1, wherein the cradle is configured to hold the head at only a single orientation.

10. A system for securing a wire harness, the system comprising:
    a tie strap extending from a head, the head configured to lock onto the tie strap;
    a support member configured to hold the wire harness; and
    a cradle adjacent to the support member, the cradle configured to hold the head of the tie strap, the cradle defining an opening for the tie strap to pass through;
    wherein:
        the tie strap is configured to secure the wire harness against the support member by extending around the support member and into cooperation with the head; and
        the cradle is configured to hold the head, and receive the head within the cradle, at only a single orientation.

11. The system of claim 10, wherein the cradle is outside of a channel defined by the support member.

12. The system of claim 10, wherein the cradle is integrally molded with the support member.

13. The system of claim 10, wherein the cradle is clipped onto the support member.

14. The system of claim 10, wherein the cradle includes a metallic clip configured to clip onto a surface of the support member.

15. The system of claim 10, wherein the cradle includes a retention tab at the opening configured to retain the tie strap within the opening and retain the head within the cradle.

16. The system of claim 10, further comprising a ledge within the cradle, the ledge configured to support the head of the tie strap.

17. A system for securing a wire harness, the system comprising:
    a tie strap extending from a head, the head configured to receive an end of the tie strap and lock onto the tie strap;
    a support member including a channel defined by a base, a first sidewall, and a second sidewall;
    a cradle outside of the channel at one of the first sidewall and the second sidewall, the cradle configured to hold the head of the tie strap at only a single orientation, the cradle defining an opening at a bottom of the cradle for the tie strap to pass through; and
    a retention tab at the opening of the cradle configured to retain the tie strap within the opening and retain the head within the cradle;
    wherein the wire harness is secured within the channel by the tie strap extending out of the cradle through the opening, under the base, across the channel, and into cooperation with the head seated in the cradle.

18. The system of claim 17, wherein the cradle includes a clamp configured to attach the cradle to one of the first sidewall and the second sidewall.

19. The system of claim 1, wherein the cradle is integrally molded with a support member configured to hold the wire harness.

20. The system of claim 1, wherein the cradle includes a clip configured to clip onto a surface of a support member that is configured to hold the wire harness.

* * * * *